(12) United States Patent
Adlung et al.

(10) Patent No.: US 8,387,049 B2
(45) Date of Patent: Feb. 26, 2013

(54) FACILITATING PROCESSING WITHIN COMPUTING ENVIRONMENTS SUPPORTING PAGEABLE GUESTS

(75) Inventors: Ingo Adlung, Altdorf (DE); Hubertus Franke, Cortlandt Manor, NY (US); Lisa C. Heller, Rhinebeck, NY (US); William A. Holder, Vestal, NY (US); Damian L. Osisek, Vestal, NY (US); Randall W. Philley, Kingston, NY (US); Martin Schwidefsky, Boeblingen (DE); Gustav E. Sittmann, III, Webster Groves, MO (US); Jong Hyuk Choi, Old Tappan, NJ (US); Ray Mansell, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 1706 days.

(21) Appl. No.: 11/182,570

(22) Filed: Jul. 15, 2005

(65) Prior Publication Data
US 2007/0016904 A1    Jan. 18, 2007

(51) Int. Cl.
G06F 9/46      (2006.01)
G06F 9/455     (2006.01)

(52) U.S. Cl. .............................. 718/100; 718/1; 718/101

(58) Field of Classification Search ............... 718/1, 100, 718/101, 104; 707/205; 711/6, 1, 100, 200, 711/206
See application file for complete search history.

(56) References Cited

U.S. PATENT DOCUMENTS

| 5,010,481 | A |   | 4/1991  | Ishida |         |
|-----------|---|---|---------|--------|---------|
| 5,295,251 | A |   | 3/1994  | Wakui et al. | 395/400 |
| 5,381,535 | A |   | 1/1995  | Gum et al. | 395/375 |
| 5,555,385 | A | * | 9/1996  | Osisek | 711/1 |
| 5,652,853 | A |   | 7/1997  | Duvalsaint et al. | 395/406 |
| 5,809,551 | A | * | 9/1998  | Blandy | 711/170 |
| 6,023,712 | A | * | 2/2000  | Spear et al. | 707/205 |
| 6,606,697 | B1 |  | 8/2003  | Kawahara et al. | 711/207 |
| 6,651,132 | B1 |  | 11/2003 | Traut  | 711/6 |

(Continued)

FOREIGN PATENT DOCUMENTS

GB     1431423      4/1976
JP     2000215071 A  8/2000

OTHER PUBLICATIONS

Notification of Transmittal of the International Search Report and the Written Opinion of the International Searching Authority, or the Declaration for PCT/EP2006/064227; Nov. 21, 2006; 10 pages.
Communication Pursuant to Article 94(3) EPC for 06 77 769.8-1243; Sep. 10, 2008; 5 pages.
U.S. Appl. No. 10/855,200, "Interpreting I/O Operation Requests From Pageable Guests Without Host Intervention," Easton et al., filed May 27, 2004.

(Continued)

*Primary Examiner* — Emerson Puente
*Assistant Examiner* — Willy W Huaracha
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Processing within a computing environment that supports pageable guests is facilitated. Processing is facilitated in many ways, including, but not limited to, associating guest and host state information with guest blocks of storage; maintaining the state information in control blocks in host memory; enabling the changing of states; and using the state information in management decisions. In one particular example, the guest state includes an indication of usefulness and importance of memory contents to the guest, and the host state reflects the ease of access to memory contents. The host and guest state information is used in managing memory of the host and/or guests.

35 Claims, 5 Drawing Sheets

U.S. PATENT DOCUMENTS

| | | | |
|---|---|---|---|
| 6,886,085 B1 | 4/2005 | Shuf et al. | 711/159 |
| 2002/0099753 A1 | 7/2002 | Hardin et al. | |
| 2003/0212873 A1 | 11/2003 | Lee et al. | |
| 2004/0064668 A1 | 4/2004 | Kjos et al. | 711/202 |
| 2004/0143664 A1 | 7/2004 | Usa et al. | |
| 2005/0060702 A1* | 3/2005 | Bennett et al. | 718/1 |
| 2005/0198633 A1* | 9/2005 | Lantz et al. | 718/1 |
| 2005/0223220 A1* | 10/2005 | Campbell et al. | 713/164 |
| 2005/0223225 A1* | 10/2005 | Campbell et al. | 713/166 |
| 2005/0268071 A1* | 12/2005 | Blandy et al. | 711/208 |
| 2009/0204718 A1* | 8/2009 | Lawton et al. | 709/230 |
| 2009/0228262 A1* | 9/2009 | Farrell et al. | 703/26 |

OTHER PUBLICATIONS

"z/Architecture—Principles of Operation," IBM Publication No. SA22-7832-02, Jun. 2003.

"z/VM: Running Guest Operating Systems," IBM Publication No. SC24-5997-02, Oct. 2001, pp. 1-179.

"z/VM: General Information Manual," IBM Publication No. GC24-5991-04, Oct. 2001, pp. 1-119.

"IBM System/370 Extended Architecture: Interpretive Execution," IBM Publication No. SA22-7095, 1985, pp. 1-32.

* cited by examiner

FACILITATING PROCESSING WITHIN COMPUTING ENVIRONMENTS SUPPORTING PAGEABLE GUESTS

TECHNICAL FIELD

This invention relates, in general, to computing environments that support pageable guests, and more particularly, to facilitating processing within such environments.

BACKGROUND OF THE INVENTION

In computing environments that support pageable guests, processing is often complicated by multiple layers of resource management. One area of processing that has realized such complications is in the area of memory management. To manage memory in such an environment, it is common for both the pageable guests and their associated hosts to manage their respective memories causing redundancy that results in performance degradation.

As an example, in an environment in which a host implements hundreds to thousands of pageable guests, the host normally over-commits memory. Moreover, a paging operating system running in each guest may aggressively consume and also over-commit its memory. This over-commitment causes the guests' memory footprints to grow to such an extent that the host experiences excessively high paging rates. The overhead consumed by the host and guests managing their respective memories may result in severe guest performance degradation.

Thus, a need exists for a capability that facilitates processing within computing environments that support pageable guests. In one particular example, a need exists for a capability that facilitates more efficient memory management in those environments supporting pageable guests.

SUMMARY OF THE INVENTION

The shortcomings of the prior art are overcome and additional advantages are provided through the provision of a method of facilitating processing within a computing environment supporting pageable guests. The method includes, for instance, associating guest state information of a guest of the computing environment with a block of memory of the guest, the guest being a pageable guest executed by a virtual machine of the computing environment, the virtual machine being managed by a host coupled to the virtual machine; and maintaining the guest state information in one or more control blocks in memory of the host.

In a further embodiment, the guest state information is used in managing memory of the computing environment. Moreover, the one or more control blocks provide host state information, which may also be used in guest memory management.

System and computer program products corresponding to the above-summarized methods are also described and claimed herein.

As a further aspect of the present invention, an instruction executing in a computing environment is provided. The instruction includes, for instance, an operation code indicating an operation to be performed, the operation including at least one of: extracting one or more of guest state information of a block of memory of a guest of the one or more pageable guests and host state information relating to the block of memory from one or more control blocks maintained in memory of the host, and setting guest state information associated with the block of memory; a first register into which at least one of guest state information and host state information is extracted, in response to the operation code indicating extraction; and a second register including a guest address of the block of memory for which at least one of guest state information and host state information is to be processed in accordance with the operation code.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, processing within computing environments supporting pageable guests is facilitated. Processing is facilitated in many ways, including, but not limited to, associating guest and host state information with guest blocks of memory or storage (storage and memory are used interchangeably herein); maintaining the state information in control blocks in host memory; enabling the changing of states by the guest; and using the state information in management decisions. In one particular example, the state information is used in managing memory of the host and/or guests.

Figure 1A:
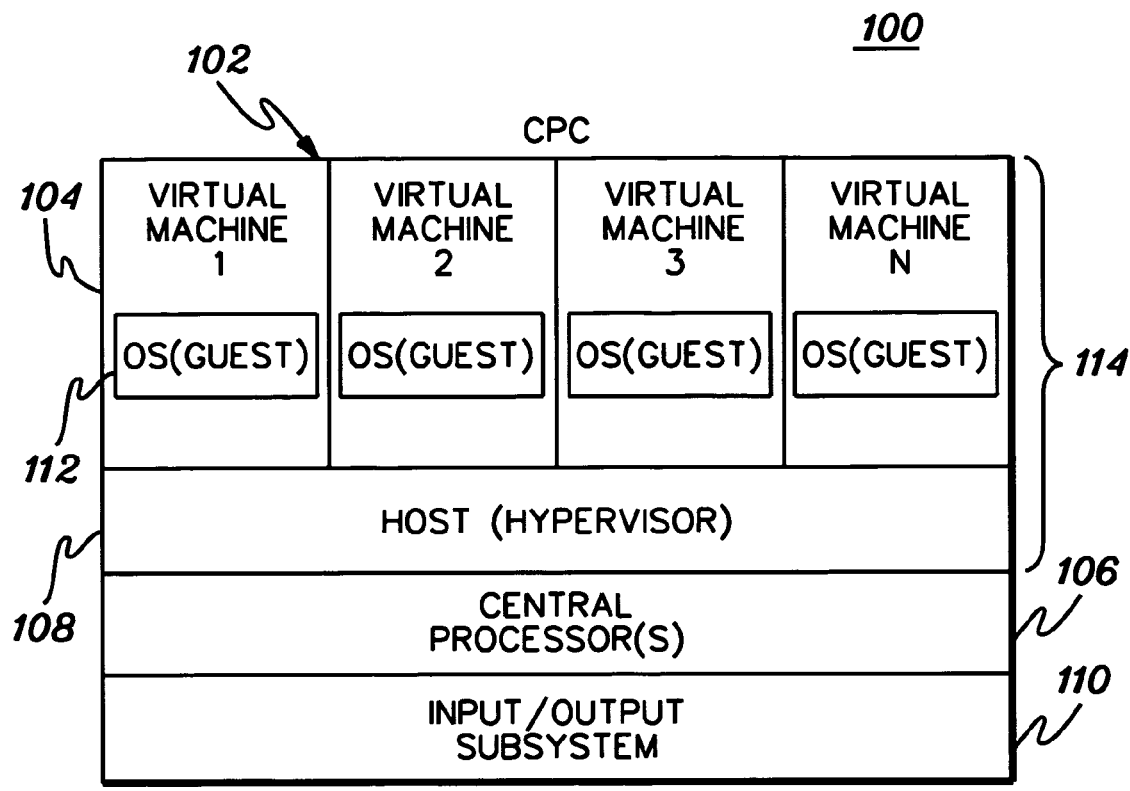
FIG. 1a depicts one embodiment of a computing environment to incorporate and use one or more aspects of the present invention.

One embodiment of a computing environment to incorporate and use one or more aspects of the present invention is described with reference to FIG. 1a. Computing environment 100 is based, for instance, on the z/Architecture offered by International Business Machines Corporation, Armonk, N.Y. The z/Architecture is described in an IBM® publication entitled, "z/Architecture Principles of Operation," IBM® Publication No. SA22-7832-02, June 2003, which is hereby incorporated herein by reference in its entirety. (IBM® is a registered trademark of International Business Machines Corporation, Armonk, N.Y., USA. Other names used herein may be registered trademarks, trademarks, or product names of International Business Machines Corporation or other companies.) In one example, a computing environment based on the z/Architecture includes an eServer zSeries, offered by International Business Machines Corporation, Armonk, N.Y.

Computing environment 100 includes, for instance, a central processor complex (CPC) 102 providing virtual machine support. CPC 102 includes, for instance, one or more virtual machines 104, one or more central processors 106, at least one host 108 (e.g., a control program, such as a hypervisor), and an input/output subsystem 110, each of which is described below. The host and one or more virtual machines are executed by the central processors from a range of physical memory 114.

The virtual machine support of the CPC provides the ability to operate large numbers of virtual machines, each capable of hosting a guest operating system 112, such as Linux. Each virtual machine 104 is capable of functioning as a separate system. That is, each virtual machine can be independently reset, execute a guest operating system, and operate with different programs. An operating system or application program running in a virtual machine appears to have access to a full and complete system, but in reality, only a portion of the real system is available to the virtual machine.

In this particular example, the model of virtual machines is a V=V (i.e., pageable) model, in which the memory of a virtual machine is backed by host virtual memory, instead of real memory. Each virtual machine has a virtual linear memory space. The physical resources are owned by host 108, and the shared physical resources are assigned by the host to the guest operating systems, as needed, to meet their processing demands. This V=V virtual machine model assumes that the interactions between the guest operating systems and the physical shared machine resources are controlled by the host, since the large number of guests typically precludes the host from simply partitioning and assigning fixed hardware resources to the configured guests. Thus, for instance, the host pages containing recently referenced portions of virtual machine memory may be kept resident in physical memory, while less recently referenced portions are paged out to host auxiliary storage, allowing over-commitment of the aggregate memory requirements of virtual machines beyond the capacity of physical memory. One or more aspects of a V=V model are further described in an IBM® publication entitled "z/VM: Running Guest Operating Systems," IBM Publication No. SC24-5997-02, October 2001, which is hereby incorporated herein by reference in its entirety.

Central processors 106 are physical processor resources that are assignable to a virtual machine. For instance, virtual machine 104 includes one or more virtual processors, each of which represents all or a share of a physical processor resource 106 that may be dynamically allocated to the virtual machine. Virtual machines 104 are managed by host 108. As examples, the host may be implemented in firmware running on processors 106 or be part of a host operating system executing on the machine. In one example, host 108 is a VM hypervisor, such as z/VM®, offered by International Business Machines Corporation, Armonk, N.Y. One embodiment of z/VM® is described in an IBM® publication entitled "z/VM: General Information Manual," IBM® Publication No. GC24-5991-04, October 2001, which is hereby incorporated herein by reference in its entirety.

Figure 1B:
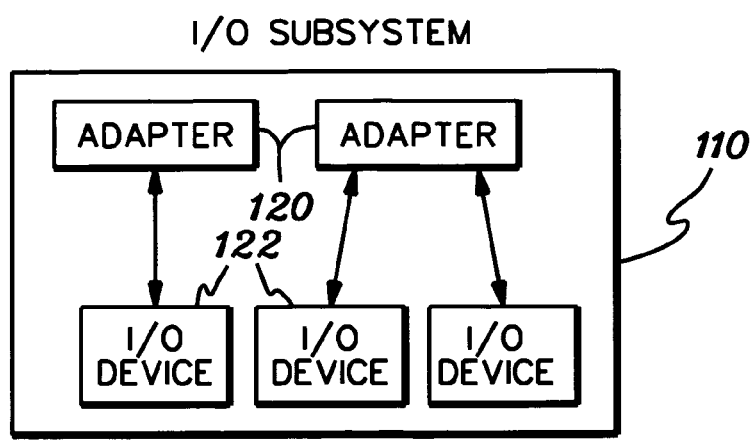
FIG. 1b depicts further details of an input/output (I/O) subsystem of FIG. 1a, in accordance with an aspect of the present invention.

Input/output subsystem 110 directs the flow of information between devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing. In one embodiment, I/O subsystem 110 includes a plurality of adapters 120 (FIG. 1b) coupled to a plurality of I/O devices 122. A particular adapter may be coupled to one or more I/O devices and an I/O device may be coupled to one or more adapters.

In accordance with an aspect of the present invention, processing within computing environment 100 is facilitated. Many aspects of processing may be facilitated, but as one example, an embodiment is described herein that relates to facilitating memory management. Specifically, a Collaborative Memory Management Facility (CMM) is described herein. However, although CMM is described herein, one or more aspects of the present invention can relate to and/or benefit other areas of processing.

The Collaborative Memory Management Facility is a facility that provides a vehicle for communicating granular page state information between a pageable guest and its host. This sharing of information between the guest and host provides the following benefits, as examples:

The host can make more intelligent decisions when selecting page frames to reclaim (steal).

Host page-write overhead is eliminated for blocks whose contents the guest has indicated are discardable.

The guest memory footprint is reduced allowing for greater memory over-commitment.

If the guest is defining and managing virtual memory for its underlying processes, the guest can make more intelligent decisions when selecting blocks to reclaim (steal). In one example, the guest makes these decisions based on host state information.

The guest can make more intelligent decisions when assigning blocks. In one example, the guest makes these decisions based on host state information.

Guest block-clearing overhead is eliminated for blocks the host has indicated contain zeros (i.e., the host has already cleared).

Figure 2:
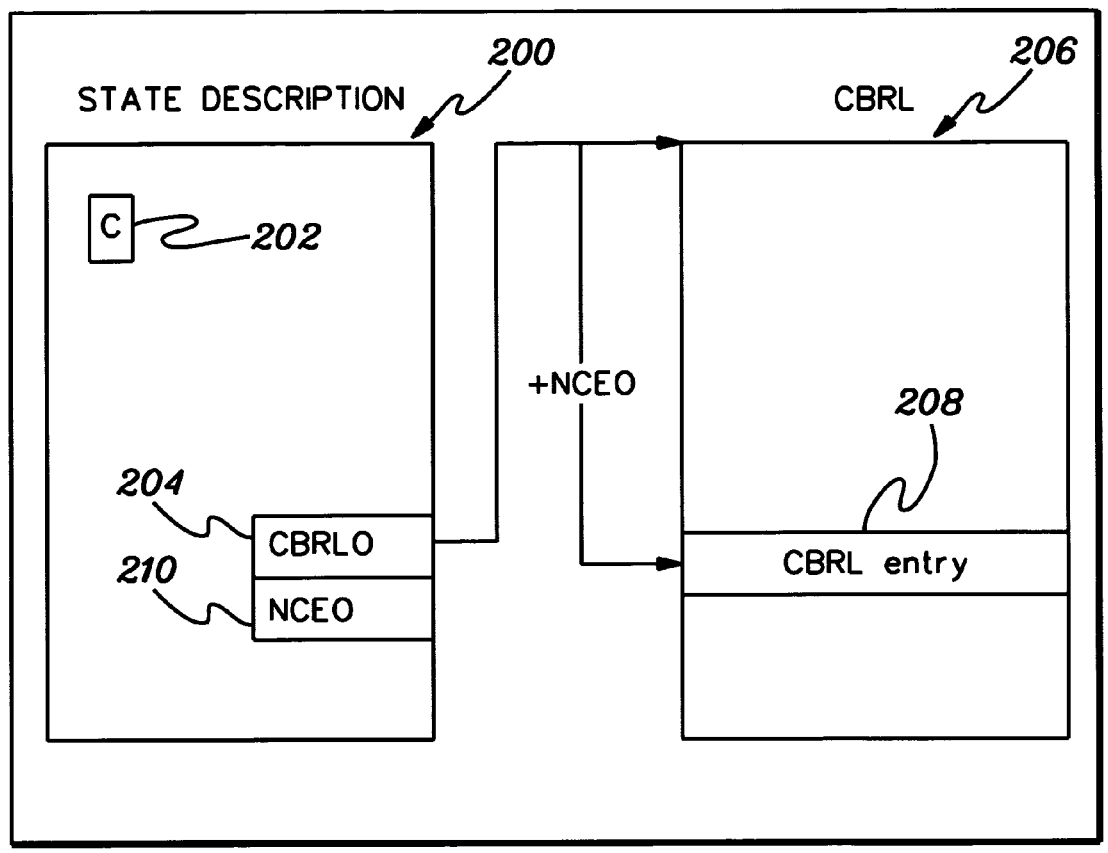
FIG. 2 illustrates an association between an interpretative execution state description and a Collaborative Memory Management Backing Reclaim Log (CBRL), in accordance with an aspect of the present invention.

To enable CMM in an environment based on the z/Architecture, a state description 200 (FIG. 2) is employed. The state description includes virtual machine state, enabling direct execution of the virtual machine by a suitably designed processor. One example of such an interpretive execution capability is described in an IBM® publication entitled, "IBM System/370 Extended Architecture: Interpretive Execution," IBM Publication No. SA22-7095 (1985), which is hereby incorporated herein by reference in its entirety.

State description 200 includes an enablement control bit (C) 202 for CMM. When this bit is one, the CMM facility is available to the guest and the guest may invoke a service (e.g., an Extract And Set Storage Attributes (ESSA) instruction) to interrogate and manipulate the block states associated with each guest block. In response to invoking the service, in one embodiment, a central processor interpretively executes the ESSA instruction via, for instance, the Interpretive Execution (SIE) architecture (a.k.a., the Start Interpretive Execution (SIE) architecture).

When the CMM enablement control bit is zero, the central processor does not interpretively execute the ESSA instruction. Thus, if a guest that is not enabled for CMM attempts to issue the ESSA instruction, an instruction interception occurs. This gives the host the option of simulating the ESSA instruction or presenting an operation exception program interruption to the guest.

In addition to control bit 202 used to enable CMM, state description 200 also includes a pointer 204 (CBRLO—CMM Backing Reclaim Log (CBRL) Origin) to a control block 206, referred to as the CMM backing reclaim log (CBRL). CBRL is auxiliary to the state description and includes a plurality of entries 208 (e.g., 511 8-byte entries). An offset to the next available entry in the CBRL is in the state description at 210

(NCEO—Next CBRL Entry Offset). Each CBRL entry that is at a location before the offset includes the guest absolute address of a guest block whose backing auxiliary storage can be reclaimed by the host.

The Collaborative Memory Management Facility of one or more aspects of the present invention includes, for instance, the following features, which are described in further detail herein:

- The association of guest and host state information with each guest block. The state information is maintained in control blocks in host memory.
- An Extract and Set Storage Attributes (ESSA) guest service that allows the guest to directly determine the guest and host states of a guest block without host involvement. The ESSA service also allows the guest to optionally change the guest state of the block. The ESSA service does this by directly accessing the host control blocks containing the state information without host involvement. In some cases, the changing of the guest state of a block also results in the changing of the host state of the block and possibly recording the block address in the CBRL.
- Enhanced host control blocks for containing the host and guest state information.
- Enhancements to host and guest behaviors that are driven by changes to the guest block states.

The association of guest and host state information with guest blocks includes the defining of available host states. As examples, the following host states are defined:

1. Resident (r) state: The guest block is present in a host page frame.
   A host page frame (a.k.a., frame, page frame) is a block (e.g., 4K-byte) of host real memory that is used to contain, or back, host pages that contain guest blocks (a.k.a., block). A host page or page is a page (e.g., 4K-byte) of virtual memory that is used to implement a block of guest memory. A block (a.k.a., guest block) is a block (e.g., 4K-byte) of memory (on, for instance, a 4K-byte boundary) that the guest views as a block of its physical (or absolute) memory.
2. Preserved (p) state: The guest block is not present in a host page frame, but has been preserved by the host in some auxiliary storage.
3. Logically Zero (z) state: The guest block is not present in a host page frame and the contents of the guest block are known to be zeros.
   The logically zero state is the initial (or default) host state.

The association of guest and host state information also includes the defining of available guest states. As examples, the following guest states are defined:

1. Stable (S) state: The contents of a stable block remain equal to what was set by the guest. The host is responsible for preserving the contents of a block in the stable state, if the backing page frame is reclaimed.
   The stable state is the default guest state of a block. When the guest changes the state of a block to a state other than stable, the guest is to change the state back to the stable state in order to ensure the contents are preserved by the host.
2. Unused (U) state: The contents of an unused block are not meaningful to the guest. After the guest sets the state of a block to the unused state, the host may at any time discard the contents of the block and reclaim the backing page frame. When the host discards the contents of the block, it changes the host state to z.
   The guest is not to reference a block in the unused state; otherwise, an addressing exception may occur.
3. Volatile (V) state: The contents of a volatile block are meaningful to the guest, but the host may at any time discard the contents of the block and reclaim the backing page frame. The guest can tolerate such loss of the block contents because it has the ability to recreate them. If the host reclaims the backing page frame, the host changes the host state of the block to z.
   The guest may attempt to reference the contents of a block in the guest volatile state. This will either succeed, if the guest/host state of the block is Vr, or will result in a block volatility exception, if the guest/host state of the block is Vz.
   Any changes the guest may make to the contents of a block in the guest volatile state will be lost, if the block is discarded.
4. Potentially Volatile (P) state: The contents of a potentially volatile block are meaningful to the guest, but based upon guest change history, the host either may discard or should preserve the contents of the block.
   If the change indicator associated with the block indicates that the block has not been changed, the host may at any time discard the contents of the block and reclaim the backing page frame. The guest can tolerate such a loss of the block contents, because it has the ability to recreate them. If the host discards a potentially volatile block, the host changes the guest/host state of the block to Vz.
   If the change indicator associated with the block indicates that the block has been changed, the host preserves the contents of the block. When the host preserves the contents on auxiliary storage, it changes the guest/host state of the block from Pr to Sp.
   The P state offers the benefits of both the V and S states. This allows the guest to change the contents of blocks in the P guest state, ensuring block content preservation by the host. For those blocks in the P guest state that are not changed by the guest, the host may efficiently discard the contents and reclaim the host page frame without incurring the overhead associated with block content preservation.

In accordance with an aspect of the present invention, the machine (e.g., firmware other than the guests and host) and the host ensure that the state of the guest block is in one of the following permissible guest/host block states: Sr, Sp, Sz, Ur, Uz, Vr, Vz, or Pr.

The state information for guest blocks is maintained, for instance, in host page tables (PTs) and page status tables (PGSTs) that describe a guest's memory. These tables include, for instance, one or more page table entries (PTEs) and one or more page status table entries (PGSTEs), respectively, which are described in further detail below.

Figure 3:
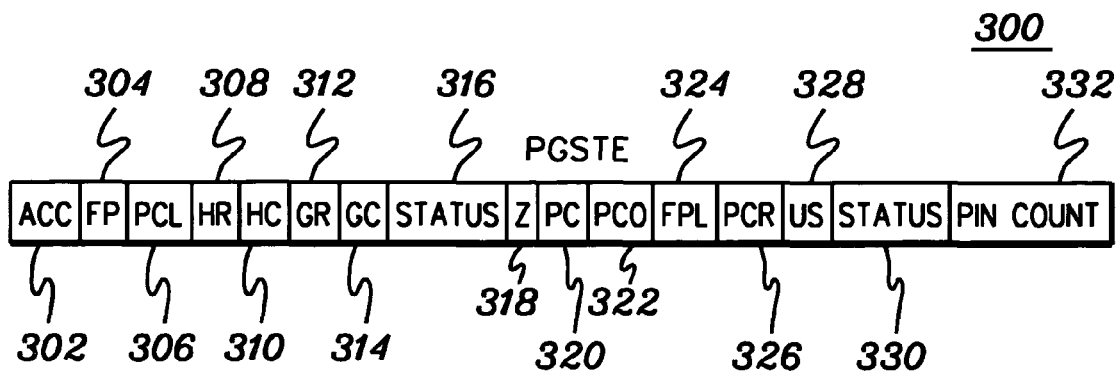
FIG. 3 depicts one example of a page status table entry (PGSTE), in accordance with an aspect of the present invention.

One example of a page status table entry 300 is described with reference to FIG. 3. Page status table entry 300 includes, for instance, the following:

(a) Acc 302: Access control key;
(b) FP 304: Fetch protection indicator;
(c) Page Control Interlock (PCL) 306: This is the interlock control for serializing updates to a page table entry (PTE) and corresponding PGSTE, except for the PGSTE status area and PGSTE bits that are marked as reserved.
(d) HR 308: Host reference backup indicator;
(e) HC 310: Host change backup indicator;
(f) GR 312: Guest reference backup indicator;
(g) GC 314: Guest change backup indicator;
(h) Status 316: Intended for host program use.
(i) Page Content Logically Zero Indicator (Z) 318: This bit is meaningful when the corresponding PTE page invalid (PTE.I) bit (described below) is one.
   When Z is one, the content of the page that is described by this PGSTE and corresponding PTE is considered to be zero. Any prior content of the page does not have to be preserved and may be replaced by a page of zeros.

When Z is zero, the content of the page described by the PGSTE and corresponding PTE is not considered to be zero. The content of the page is preserved by the host.

When the Z bit is one and the corresponding PTE.I bit is one, the host state is z. This means that the page content may be replaced by the host or by a function of the Host Page Management Assist facility which is described in U.S. Ser. No. 10/855,200 entitled "Interpreting I/O Operation Requests From Pageable Guests Without Host Intervention," Easton et al., filed May 27, 2004, which is hereby incorporated herein by reference in its entirety.

When the Z bit is one, the corresponding PTE.I bit is one, and the page content is replaced, the page should be replaced by associating it with a frame that has been set to zeros.

When the Z bit is zero and the PTE invalid bit is one, the host state is p.

(i) Page Class (PC) 320: When zero, the page described by the PGSTE and corresponding PTE is a class 0 page and the delta pinned page count array (DPPCA) for class 0 pages is used for counting pinning and unpinning operations for the page. When one, the page described by the PGSTE and corresponding PTE is a class 1 page and the DPPCA for class 1 pages is used for counting pinning and unpinning operations for the page.

(j) Pin Count Overflow (PCO) 322: When one, the pin count field is in an overflow state. When zero, the pin count field is not in an overflow state. In this case, the total pin count is kept by the host in another data structure not accessed by the machine.

(k) Frame Descriptor On Processed Frame Descriptor List (FPL) 324: When one, a frame descriptor for the page described by the PGSTE and corresponding PTE is in a processed frame descriptor list. The frame descriptor identifies the host page frame that was used by the HPMA resolve host page function for the page.

(l) Page Content Replacement Requested (PCR) 326: When one, page content replacement was requested when the HPMA resolve host page function was invoked for the page represented by the PGSTE and corresponding PTE.

(m) Usage State (US) 328: Indicates whether the guest state is S, U, V or P.

(n) Status 330: Intended for host program use.

(o) Pin Count 332: An unsigned binary integer count used to indicate whether the content of the host virtual page represented by the PGSTE and corresponding PTE is pinned in the real host page frame specified by the page frame real address field of the PTE. When the value of this field is greater than zero or the page count overflow (PCO) bit is one, the corresponding page is considered to be pinned. When the value of this field is zero and the PCO bit is zero, the corresponding page is not considered to be pinned.

At the time a page is pinned by either the host or the CPU, this field should be incremented by 1. At the time a page is unpinned by either the host or the CPU, this field should be decremented by 1.

When the value of the pin count field is greater than zero or the PCO bit is one, the corresponding PTE.I (page invalid) bit is to be zero. Otherwise, unpredictable results may occur.

While a page is pinned, the host program should not change the contents of the PTE page frame real address (PFRA) field, the setting of the PTE page invalid (I) bit, or the setting of the page protection (P) bit in the PTE or segment table entry (STE). Otherwise unpredictable results may occur.

One or more of the PGSTE fields described above are provided for completeness, but are not needed for one or more aspects of the present invention.

Figure 4:
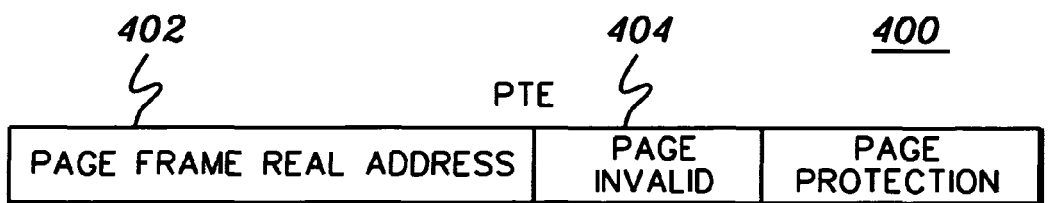
FIG. 4 depicts one example of a page table entry (PTE), in accordance with an aspect of the present invention.

A PGSTE corresponds to a page table entry (PTE), an example of which is described with reference to FIG. 4. A page table entry 400 includes, for instance:

(a) Page Frame Real Address (PFRA) 402: This field provides the leftmost bits of a real (in this case, host real) storage address. When these bits are concatenated with the byte index field of the virtual address on the right, the real address is obtained.

(b) Page Invalid Indicator (I) 404: This field controls whether the page associated with the page table entry is available. When the indicator is zero, address translation proceeds by using the page table entry. Further, the host state is r. When the indicator is one, the page table entry cannot be used for translation, and the host state is p or z, as determined by PGSTE.Z.

(c) Page Protection Indicator 406: This field controls whether store accesses are permitted into the page.

Further details regarding page table entries and page tables, as well as segment table entries mentioned herein, are provided in an IBM® publication entitled, "z/Architecture Principles of Operation," IBM® Publication No. SA22-7832-02, June 2003, which is hereby incorporated herein by reference in its entirety. Moreover, further details regarding the PGSTE are described in U.S. Ser. No. 10/855,200 entitled "Interpreting I/O Operation Requests From Pageable Guests Without Host Intervention," Easton et al., filed May 27, 2004, which is hereby incorporated herein by reference in its entirety.

Figure 5:
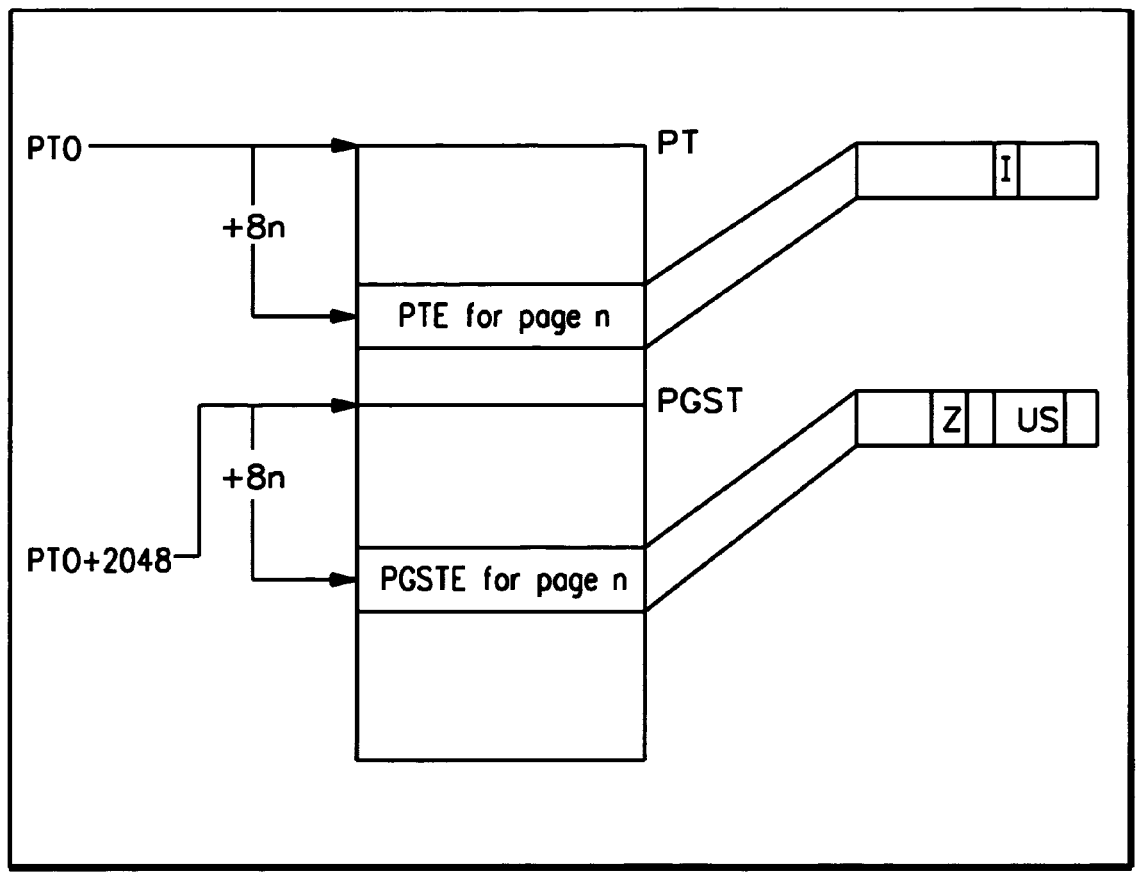
FIG. 5 illustrates a correspondence of PTEs to PGSTEs, in accordance with an aspect of the present invention.

In one embodiment, there is one page status table per page table, the page status table is the same size as the page table, a page status table entry is the same size as a page table entry, and the page status table is located at a fixed displacement (in host real memory) from the page table. Thus, there is a one-to-one correspondence between each page table entry and page status table entry. Given the host's virtual address of a page, both the machine and the host can easily locate the page status table entry that corresponds to a page table entry for a guest block. This is illustrated in FIG. 5, in which PTO is page table (PT) origin; I is the PTE invalid bit; Z is the PGSTE logically zero bit; and US is the PGSTE usage state field.

In order for a guest to extract the current guest and host block states from the PGSTE and to optionally set the guest state, a service is provided, in accordance with an aspect of the present invention. This service is referred to herein as the Extract and Set Storage Attributes (ESSA) service. This service can be implemented in many different ways including, but not limited to, as an instruction implemented in hardware or firmware, as a hypervisor service call, etc. In the embodiment described herein, it is implemented as an instruction, as one example, which is executed by the machine without intervention by the host, at the request of a guest.

Figure 6:
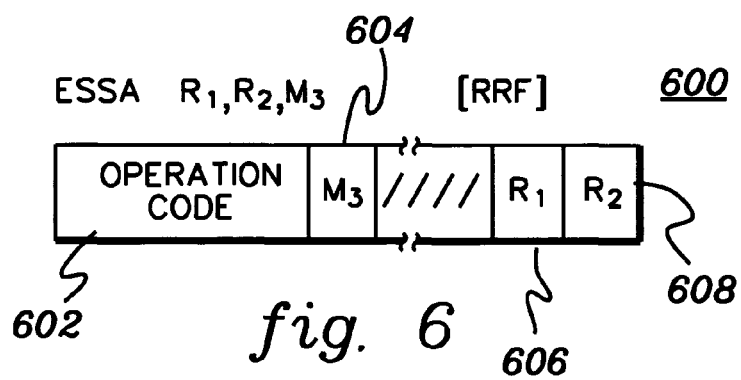
FIG. 6 depicts one example of the format of an Extract And Set Storage Attributes (ESSA) instruction, in accordance with an aspect of the present invention.

The Extract And Set Storage Attributes instruction is valid for pageable guests for which the CMM facility is enabled. One example of a format of an ESSA instruction is described with reference to FIG. 6. An Extract And Set Storage Attributes instruction 600 includes an operation code 602 specifying that this is the ESSA instruction; an $M_3$ field 604 (input) indicating the operation to be performed; a designation 606 ($R_1$) for an output register into which the guest and host block states are extracted; and a designation 608 ($R_2$) for an input register which designates the guest absolute address of the block for which the block states are to be extracted and optionally set, per the operation code. With this instruction, the guest state and the host state of the block designated by the second operand are extracted into the first operand location.

The guest state and host state may be optionally set based on the value of the $M_3$ field. Asynchronous to the execution of the instruction, either or both the guest state and the host state may be changed.

The $M_3$ field designates an operation request code specifying the operation to be performed. Example operations include:

Extract Block Attributes: The current guest and host states of the designated block are extracted. No change is made to either state.

In other embodiments, for any of the operations herein, the guest or host state may be extracted without the other.

Set Stable State: The current guest and host states of the designated block are extracted. Following extraction of the states, the guest state is set to the stable state (S).

By extracting the host state, the guest is able to recognize when the host state is logically zero, and bypass reclearing the page if it is logically zero.

Set Unused State: The current guest and host states are extracted. Following extraction, the guest state is set to the unused state (U). Further, if the host block state is the preserved state (p), the contents of the block are discarded, the guest reference and change bits are set to zero, the address of the block is recorded in the CBRL, and the host block state is set to the logically zero state (z).

Recording an address in the CBRL includes, for instance, storing the address in the next available entry, as designated by the CBRLO and NCEO, and incrementing the NCEO by 8. However, if the NCEO is already at its limit (for instance, 4088), indicating that the CBRL is full, then instead, execution of the ESSA instruction is suppressed, and an interception is presented to the host, allowing the host to empty the CBRL.

Set Volatile State: The current guest and host block states are extracted. Following extraction, the guest block state is set to the volatile state (V). Also, if the host block state is the preserved state (p), the contents of the block are discarded, the guest reference and change bits are set to zero, the address of the block is recorded in the CBRL (as described above) and the host block state is set to the logically zero state (z).

Alternatively, if the host block state is resident (r), the contents are not immediately discarded, but the host may discard them subsequently, changing the host block state to the logically zero state (z).

Set Potentially Volatile State: The current guest and host block states are extracted. Following extraction, one of the following occurs:

(1) If the host block state is the resident state (r), the guest block state is set to the potentially volatile state (P).

Figure 7:
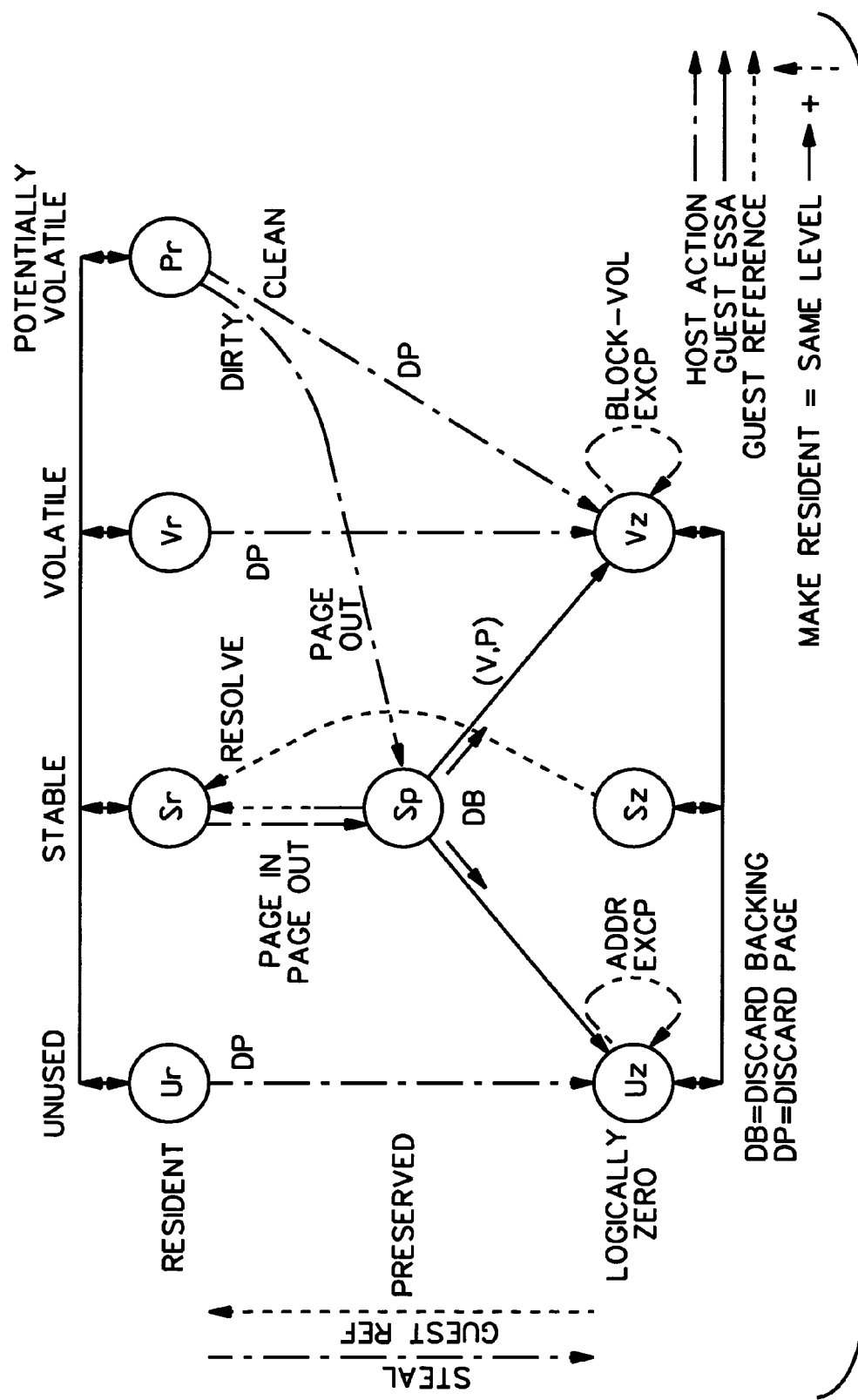
FIG. 7 depicts one example of a finite state machine for the Extract and Set Storage Attributes instruction, in accordance with an aspect of the present invention.

(2) If the host block state is the preserved state (p) and the block has been changed by the guest, the guest block state remains the stable state (S) (as shown in FIG. 7, described below, the preserved host state only occurs in conjunction with the stable guest state) and the host state remains the preserved state.

(3) If the host block state is the preserved state (p) and the block has not been changed by the guest, the contents of the block are discarded, the guest reference and change bits are set to zero, the address of the block is recorded in the CBRL, the guest block state is set to the volatile state (V), and the host block state is set to the logically zero state (z).

(4) If the host block state is the logically zero state (z), the guest block state is set to the volatile state (V).

Set Stable and Make Resident: The current guest and host block states are extracted, and the guest state is set to the stable state (S). Also, if the host block state is not in the resident state, the following occurs: if a Host Page Management Assist facility (HPMA) is installed and enabled, it is invoked to attempt to make the block resident. If the Host Page Management Assist facility is not installed, is not enabled or fails to make the block resident, an instruction interception is recognized, leaving the original guest and host states unchanged. In this case, the host makes the block stable and resident, which may involve restoring the block from auxiliary storage. (Host Page Management Assist is described in detail in U.S. Ser. No. 10/855,200 entitled "Interpreting I/O Operation Requests From Pageable Guests Without Host Intervention," Easton et al., filed May 27, 2004, which is hereby incorporated herein by reference in its entirety.)

Set Stable If Resident: The current guest and host block states are extracted. Following extraction, the guest state is set to the stable state (S), if the host state is the resident state (r).

In one embodiment, the set operations accomplish the extracting and setting in an atomic operation. In an alternate embodiment, the setting may be performed without extracting or by extracting only the guest or host state.

As described above, if the program issues an Extract And Set Storage Attributes instruction which would result in an impermissible combination of guest and host states, the machine will replace the impermissible combination with a permissible combination. The table below summarizes which combinations are permissible and which are not. The table also shows the state combinations (in parentheses) which replace the impermissible combinations.

|  |  | Host States | | |
|---|---|---|---|---|
|  |  | r | p | z |
| Guest States | S | Y | Y | Y |
|  | U | Y | N(Uz)[1] | Y |
|  | V | Y | N(Vz)[2] | Y |
|  | P | Y | N(Sp)[3] (Vz)[3] | N(Vz)[4] |

Legend:
r—Resident host state
p—Preserved host state
z—Logically-zero content host state
S—Stable guest state
U—Unused guest state
V—Volatile guest state
P—Potentially volatile guest state
Y—Yes - permissible
N—No - not permissible The footnotes on the guest/host state combinations shown in parentheses are described below:
[1] Use of ESSA instruction to set the guest state of a block in the preserved state to the unused state will result in discarding the block contents by changing the guest state to the unused state and the host state to the logically zero state.
[2] Use of the ESSA instruction to set the guest state of a block in the preserved state to the volatile state will result in discarding the block contents by changing the guest state to the volatile state and the host state to the logically zero state.
[3] Use of the ESSA instruction to set the guest state of a block in the preserved state to the potentially volatile state will result in the guest state remaining the stable state and the host state remaining the preserved state, if the block has been changed, or will result in discarding the block by changing the guest state to the volatile state and the host state to the logically zero state, if the block has not been changed.
[4] Use of the ESSA instruction to set the guest state of a block in the logically zero host state to the potentially volatile state will result in changing the guest state to the volatile state and the host state will remain the logically zero state.

A state diagram representing transitions between the various states is depicted in FIG. 7. In one example, a finite state machine is built to implement the states and the transitions between the states. The states illustrated in the state diagram are described above. For example, Ur indicates an unused guest state/resident host state; Uz indicates an unused guest state/logically zero host state; Sr—stable guest state/resident host state; Sp—stable guest state/preserved host state; Sz—stable guest state/logically zero host state. The Sz state is the initial (default) guest/host state for a page. Since Sz is the initial state, a virtual machine that does not invoke the ESSA service has its storage managed, as if all the guest blocks are in the stable state; Vr—volatile guest state/resident host state; Vz—volatile guest state/logically zero host state; Pr—potentially volatile guest state/resident host state.

Transitions depicted in the figure include host-initiated operations, such as stealing a frame backing a resident page, paging into or out of auxiliary storage; guest-initiated operations through the ESSA service or through references to memory locations; and implicit operations, such as discarding the page contents or backing storage, which arise from the explicit host and guest operations. Further, in the figure, a block is considered "dirty" (guest page changed), if the guest has no copy of the content on backing storage. Likewise, a block is clean (guest page unchanged), if the guest has a copy of the content on backing storage. Resolve stands for backing a block indicated as Sz with a real resident zero filled memory block.

When the ESSA instruction completes, the general register designated by the $R_1$ field contains the guest state and host state of the designated block before any specified state change is made. As one example, this register includes guest state (a.k.a., block usage state (US)) and host state (a.k.a., block content state (CS)). The guest state includes a value indicating the block usage state of the designated block including, for instance, stable state, unused state, potentially volatile state, and volatile state. The host state includes a value indicating the block content state of the designated block including, for instance, resident state, preserved state, and logically zero state.

When the ESSA instruction recognizes, by analysis of the guest and host states and requested operation, that the contents of a block in backing auxiliary storage may be discarded and the CBRL for the guest is not full, the host state of the block is set to z, and an entry is added to the CBRL that includes the guest address of the block. Later, when the processor exits from interpretive execution of the guest, the host processes the CBRL and reclaims the backing page frames and associated backing auxiliary storage of the guest blocks that are recorded in the CBRL. After this processing, the CBRL is empty of entries (i.e., the host sets the NCEO filed in the state description to zero).

When the ESSA instruction recognizes that the contents of a block in backing auxiliary storage may be discarded and the CBRL is full, an instruction interception occurs, the host processes the CBRL, as described above, either simulates the ESSA instruction, or adjusts guest state so that the machine will re-execute it, and then redispatches the guest.

At any time, the host may reclaim the frame for a block that is in the S guest state or for a block that has been changed and is in the P guest state. In these cases, the host preserves the page in auxiliary storage and changes the host state to p, and the guest state to S, if not already so.

The host may also reclaim the frame for a block that is in the U or V guest state or for a block that has not been changed and is in the P guest state. In these cases, the host does not preserve the block contents, but rather places the page into the z host state and, if it was in the P guest state, changes the guest state to V. For maximum storage management efficiency, the host should reclaim frames for blocks that are in the U guest state before reclaiming frames for blocks that are in the S guest state. Similarly, there may be value in reclaiming V or unchanged P frames in preference to S frames.

In summary, the Extract And Set Storage Attributes service locates the host PTE and PGSTE for the designated guest block (specified as guest absolute address); obtains the page control interlock (as is done for guest storage key operations and HPMA operations), issuing an instruction interception, if the interlock is already held; fetches current page attributes: bits from PGSTE.US field, plus PTE.I; optionally sets attributes in the PGSTE; for Set Stable and Make Resident operations, invokes the HPMA resolve host page function to make a page resident and clears PTE.I (e.g., sets PTE.I to zero); immediately discards page contents for Set Unused, Set Volatile, and Set Potentially Volatile states, if the host state is preserved—host auxiliary storage reclamation deferred via CMM backing reclaim log (CBRL); releases page control interlock; and returns old page attributes in the output register. This service is invoked by a guest, when, for instance, the guest wishes to interrogate or change the state of a block of memory used by the guest.

The host is able to access the guest states in PGSTE and make memory management decisions based on those states. For instance, it can determine which pages are to be reclaimed first and whether the backing storage needs to be preserved. This processing occurs asynchronously to execution of ESSA. As a result of this processing, guests states may be changed by the host.

With CMM, various exceptions may be recognized. Examples of these exceptions include a block volatility exception, which is recognized for a guest when the guest references a block that is in the guest/host state of Vz; and an addressing exception, which is recognized when a guest references a block in the Uz state. Blocks in the Vz or Uz state are treated as if they are not part of the guest configuration by non-CPU entities (e.g., an I/O channel subsystem), resulting in exception conditions appropriate for those entities.

In one embodiment, in response to the guest receiving a block volatility exception (or other notification), the guest recreates the content of the discarded block. The content may be recreated into the same block or an alternate block. Recreation may be performed by, for instance, reading the contents from a storage medium via guest input/output (I/O) operations, or by other techniques.

As one example, to recreate the content into an alternate block, a block is selected and the content is written into the selected block (e.g., via an I/O operation or other operation). Then, the selected block is switched with the discarded block.

To perform the switch, a service is provided that is used by the guest to swap the host translations (or mappings) of the two blocks. This service may be implemented in many ways, including but not limited to, as an instruction implemented in hardware or firmware, or as a hypervisor service call, etc. The service atomically replaces the contents of the PTE and host and guest state information in the PGSTE (collectively, referred to herein as translation and state information) of the discarded block with translation and state information (e.g., the contents of the PTE and host and guest state information in the PGSTE) of the recreated block, and vice versa.

In a further embodiment, the contents of the PTE and host and guest state information of the recreated block replace the corresponding contents in the discarded block without having the contents of the discarded block replace the contents of the recreated block. Alternatively, the recreated block could, for instance, be set to the Uz state.

Described in detail above is a capability for facilitating processing in a computing environment that supports pageable guests. One particular area of processing that is facilitated is in the area of memory management. For instance, a Collaborative Memory Management facility is provided that enables collaboration among a host, the machine and its pageable guests in managing their respective memories. It includes communicating block state information between the guest and the host, and based on that state information, the host and guest taking certain actions to more efficiently manage memory. Advantageously, in one example, the solution provided enables memory footprints and paging rates associated with the execution of n=many virtual servers to be reduced, thereby providing corresponding guest and host performance improvements.

With one or more aspects of the present invention, second level virtual storage is more efficiently implemented and managed. As an example, page state information may be associated with guest blocks used to back the second level virtual storage and manipulated and interrogated by both the host and guest in order that each can more efficiently manage its storage. Dynamic collaboration between host and guest with respect to paging information, specifically page state information, is provided.

In virtual environments, the host (e.g., hypervisor) is to faithfully emulate the underlying architecture. Therefore, previously, irrespective of the content of a page in the guest, the host would back that page up. That is, the host assumed (sometimes incorrectly) that the contents of all guest pages were needed by the guest. However, in accordance with an aspect of the present invention, by the guest providing the host with certain information about the guest state and its ability to regenerate content, if necessary, the host can circumvent certain operations reducing overhead and latency on memory page operations.

Advantageously, various benefits are realized from one or more aspects of the present invention. These benefits include, for instance, host memory management efficiency, in which there is more intelligent selection of page frames to be reclaimed (for instance, by reclaiming frames backing unused pages in preference to those backing other pages) and reduced reclaim overhead (avoiding page writes where possible); and guest memory management efficiency, in which double clearing of a page on reuse is avoided (by recognizing that the page has been freshly instantiated from the logically zero state); and more intelligent decisions are made in assigning and/or reclaiming blocks (by favoring reuse of already-resident blocks over use of blocks not currently resident). Additionally, the guest memory footprint is reduced at lesser impact to the guest (by trimming unused blocks), allowing for greater memory over-commit ratios.

While various examples and embodiments are described herein, these are only examples. Many variations to these examples are included within the scope of the present invention. For example, the computing environment described herein is only one example. Many other environments may include one or more aspects of the present invention. For instance, different types of processors, guests and/or hosts may be employed. Moreover, other types of architectures can employ one or more aspects of the present invention.

Although the present invention has been described in the context of host and guest operating systems, these techniques could also be applied for collaboration between a single operating system and a sophisticated application which manages its own memory pool, such as a buffer pool for database or networking software. Many other variations are also possible.

Further, in the examples of the data structures described herein, there may be many variations, including, but not limited to a different number of bits; bits in a different order; more, fewer or different bits than described therein; more, fewer or different fields; fields in a differing order; different sizes of fields; etc. Again, these fields are only provided as an example, and many variations may be included. Further, indicators and/or controls described herein may be of many different forms. For instance, they may be represented in a manner other than by bits. As another example, guest state information may include a more granular indication of the degree of importance of the block contents to the guest, as a further guide to host page selection decisions.

Yet further, the guest and/or host state information may be maintained or provided by control blocks other than the PGSTE and PTE.

As used herein, the term "page" is used to refer to a fixed size or a predefined size area of storage. The size of the page can vary, although in the examples provided herein, a page is 4K. Similarly, a storage block is a block of storage and as used herein, is equivalent to a page of storage. However, in other embodiments, there may be different sizes of blocks of storage and/or pages. Many other alternatives are possible. Further, although terms such as "tables", etc. are used herein, any types of data structures may be used. Again, those mentioned herein are just examples.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating management of state information, said method comprising:

associating guest state information of a guest of the computing environment with a block of memory assigned to the guest, the associating comprising defining one or more available guest memory states, wherein a guest memory state describes a state of the block of memory as it relates to the guest, said guest being executed by a virtual machine of the computing environment, said virtual machine being managed by a host coupled to the virtual machine and being of a pageable model in which memory of the virtual machine is backed by host virtual memory instead of real memory, and wherein current guest state information is maintained in one or more control blocks in memory of the host, the current guest state information comprising one of the available guest memory states indicating the current state of the block of memory assigned to the guest; and providing to the guest state information of the block of memory assigned to the guest absent host involvement, wherein the guest state information provided to the guest comprises a guest memory state indicating a particular meaning contents of the block of memory have to the guest, and wherein the providing comprises directly accessing the one or more control blocks maintained in memory of the host without host involvement to provide the guest state information to the guest.

2. The method of claim 1, wherein host state information of the host is provided by one or more control blocks in memory of the host, and wherein the method further comprises providing the guest access to the host state information.

3. The method of claim 2, further comprising managing memory of the guest based on the host state information accessible to the guest.

4. The method of claim 1, further comprising changing, by the guest, guest state information maintained in at least one control block of the one or more control blocks maintained in memory of the host, wherein the changing is performed absent host intervention.

5. The method of claim 4, wherein the changing is performed via an instruction issued by the guest.

6. The method of claim 4, wherein the changing of the guest state information causes host state information associated with the block of memory to be changed.

7. The method of claim 1, further comprising accessing, by the host, the guest state information to enable the host to manage memory of the computing environment based on the guest state information.

8. The method of claim 7, further comprising reclaiming by the host one or more backing frames of memory, wherein the reclaiming results in changing guest state information maintained in one or more control blocks in memory of the host.

9. The method of claim 8, wherein the host selects one or more backing frames to reclaim based in part on the guest state information.

10. The method of claim 1, wherein the guest memory state comprises a volatile state in which contents of the block of memory are meaningful to the guest, but can be discarded by the host, with notification to the guest, since the guest can recreate the contents.

11. The method of claim 10, in which the notification is by an interruption at the time of the guest's attempted reference to the discarded contents.

12. The method of claim 10, further comprising recreating by the guest the content of the discarded block, in response to the guest receiving the notification.

13. The method of claim 12, wherein the recreating comprises recreating the content of the discarded block in an alternate block.

14. The method of claim 13, further comprising switching the discarded block with the alternate block, wherein the switching comprises replacing translation and state information of the discarded block with translation and state information of the alternate block.

15. The method of claim 1, wherein the guest memory state comprises a potentially volatile state in which contents of the block of memory are meaningful to the guest, but can be discarded by the host, if the contents are unchanged, since the guest can recreate the unchanged contents.

16. The method of claim 1, further comprising:
determining based on the guest state information that contents of the block of memory in backing auxiliary storage may be discarded; and
tracking this block of memory for later deletion from the backing auxiliary storage, wherein the tracking comprises including a guest address of the block of memory in a data structure accessible by the host.

17. The method of claim 1, wherein the providing comprises:
executing an Extract and Set Storage Attributes (ESSA) machine instruction to extract the guest state information from at least one control block of the one or more control blocks, the ESSA machine instruction comprising:
an operation code indicating an operation to be performed, said operation comprising extracting the guest state information from the at least one control block;
a first register into which the guest state information is extracted, in response to the operation code indicating extraction; and
a second register including a guest address of the block of memory for which the guest state information is to be extracted.

18. The method of claim 1, wherein the guest memory state of the block of memory comprises one of: a stable state, an unused state, a volatile state, or a potentially volatile state.

19. The method of claim 1, wherein the directly accessing is responsive to a request by the guest to obtain the guest state information of the guest.

20. A computer system for facilitating management of state information, said computer system comprising:
a memory; and
a processor in communications with the memory, wherein the computer system is configured to perform a method, said method comprising:
associating guest state information of a guest of the computing, environment with a block of memory assigned to the guest, the associating comprising defining one or more available guest memory states, wherein a guest memory state describes a state of the block of memory as it relates to the guest, said guest being executed by a virtual machine of the computing environment, said virtual machine being managed by a host coupled to the virtual machine and being of a pageable model in which memory of the virtual machine is backed by host virtual memory instead of real memory, and wherein current guest state information is maintained in one or more control blocks in memory of the host, the current guest state information comprising one of the available guest memory states indicating the current state of the block of memory assigned to the guest; and
providing to the guest state information of the block of memory assigned to the guest absent host involvement, wherein the guest state information provided to the guest comprises a guest memory state indicating a particular meaning contents of the block of memory have to the guest, and wherein the providing comprises directly accessing the one or more control blocks maintained in memory of the host without host involvement to provide the guest state information to the guest.

21. The computer system of claim 20, wherein host state information of the host is provided by one or more control blocks in memory of the host, and wherein the method further comprises providing the guest access to the host state information.

22. The computer system of claim 21, wherein the method further comprises managing memory of the guest based on the host state information accessible to the guest.

23. The computer system of claim 22, wherein the method further comprises changing, by the guest, guest state information maintained in at least one control block of the one or more control blocks maintained in memory of the host, wherein the changing is performed absent host intervention.

24. The computer system of claim 23, wherein the changing of the guest state information causes host state information associated with the block of memory to be changed.

25. The computer system of claim 20, wherein the host has access to the guest state information to enable the host to manage memory of the computing environment based on the guest state information.

26. The computer system of claim 25, wherein the method further comprises reclaiming, by the host, one or more backing frames of memory of the computing environment, wherein the reclaiming results in changing guest state information maintained in one or more control blocks in memory of the host.

27. The computer system of claim 20, further comprising: determining based on the guest state information that contents of the block of memory in backing auxiliary storage may be discarded; and tracking this block of memory for later deletion from the backing auxiliary storage.

28. A computer program product for facilitating management of state information, said computer program product comprising:
a non-transitory computer readable storage medium readable by a processor and storing instructions for execution by the processor for performing a method comprising:
associating guest state information of a guest of the computing environment with a block of memory assigned to the guest, the associating comprising defining one or more available guest memory states, wherein a guest memory state describes a state of the block of memory as it relates to the guest, said guest being executed by a virtual machine of the computing environment, said virtual machine being managed by a host coupled to the virtual machine and being of a pageable model in which memory of the virtual machine is backed by host virtual memory instead of real memory, and wherein current guest state information is maintained in one or more control blocks in memory of the host, the current guest state information comprising one of the available guest memory states indicating the current state of the block of memory assigned to the guest; and
providing to the guest state information of the block of memory assigned to the guest absent host involvement, wherein the guest state information provided to the guest comprises a guest memory state indicating a particular meaning contents of the block of memory have to the guest, and wherein the providing comprises directly accessing the one or more control blocks maintained in memory of the host without host involvement to provide the guest state information to the guest.

29. The computer program product of claim 28, wherein host state information of the host is provided by one or more control blocks in memory of the host, and wherein the method further comprises:
providing the guest access to the host state information; and
managing memory of the guest based on the host state information accessible to the guest.

30. The computer program product of claim 28, wherein the method further comprises changing, by the guest, guest state information maintained in at least one control block of the one or more control blocks maintained in memory of the host, wherein the changing is performed absent host intervention.

31. The computer program product of claim 30, wherein the changing of the guest state information causes host state information associated with the block of memory to be changed.

32. The computer program product of claim 28, wherein the method further comprises accessing, by the host, the guest state information to enable the host to manage memory of the computing environment based on the guest state information.

33. The computer program product of claim 32, wherein the method further comprises reclaiming by the host one or more backing frames of memory, wherein the reclaiming results in changing guest state information maintained in one or more control blocks in memory of the host.

34. The computer program product of claim 28, wherein the method further comprises:
determining based on the guest state information that contents of the block of memory in backing auxiliary storage may be discarded; and
tracking this block of memory for later deletion from the backing auxiliary storage.

35. A computer program product for facilitating management of state information, said computer program product comprising:
a non-transitory computer readable storage medium readable by a processor and storing instructions for execution by the processor for performing a method comprising:
obtaining a machine instruction, the machine instruction comprising:
an operation code indicating an operation to be performed, said operation comprising at least one of: extracting, absent host involvement, one or more of guest state information of a block of memory assigned to a guest of the computing environment and host state information relating to the block of memory from one or more control blocks maintained in memory of the host, and setting, absent host involvement, guest state information associated with the block of memory, wherein guest state information comprises guest memory state, the guest memory state describing a state of the block of memory as it relates to the guest and indicating a particular meaning contents of the block of memory have to the guest;
a first register into which at least one of guest state information and host state information is extracted, in response to the operation code indicating extraction; and
a second register including a guest address of the block of memory for which at least one of guest state information and host state information is to be processed in accordance with the operation code; and
executing the machine instruction.

* * * * *